US008597608B2

(12) United States Patent
Reynolds et al.

(10) Patent No.: US 8,597,608 B2
(45) Date of Patent: Dec. 3, 2013

(54) MANGANESE TETRATHIOTUNGSTATE MATERIAL

(75) Inventors: Michael Anthony Reynolds, Katy, TX (US); Charles Roy Donaho, Richmond, TX (US)

(73) Assignee: Shell Oil Company, Houston, TX (US)

( * ) Notice: Subject to any disclaimer, the term of this patent is extended or adjusted under 35 U.S.C. 154(b) by 547 days.

(21) Appl. No.: 13/010,879

(22) Filed: Jan. 21, 2011

(65) Prior Publication Data

US 2011/0177334 A1 Jul. 21, 2011

Related U.S. Application Data

(60) Provisional application No. 61/297,073, filed on Jan. 21, 2010.

(51) Int. Cl.
*B01J 27/04* (2006.01)
*B01J 27/047* (2006.01)
*C01B 17/00* (2006.01)
*C01G 41/00* (2006.01)
*C01G 45/00* (2006.01)

(52) U.S. Cl.
USPC .......................................... 423/511; 502/219

(58) Field of Classification Search
USPC ........................................... 423/511; 502/219
See application file for complete search history.

(56) References Cited

U.S. PATENT DOCUMENTS

| 3,458,433 A | 7/1969 | Wood et al. ............... 208/89 |
| 3,904,513 A | 9/1975 | Fischer et al. ............ 208/264 |
| 4,208,271 A | 6/1980 | Cosyns et al. ............ 208/255 |
| 4,243,553 A | 1/1981 | Naumann et al. ........... 252/439 |
| 4,243,554 A | 1/1981 | Naumann et al. ........... 252/439 |
| 4,424,142 A | 1/1984 | Asaoka et al. ............. 502/84 |
| 4,425,278 A | 1/1984 | Wirth et al. ............ 260/429 R |
| 4,454,024 A | 6/1984 | Singhal et al. ............ 208/111 |
| 4,510,260 A | 4/1985 | Stiefel et al. ............ 502/219 |
| 4,514,517 A | 4/1985 | Ho et al. ................. 502/220 |
| 4,547,321 A | 10/1985 | Stiefel et al. ............. 556/14 |
| 4,557,821 A | 12/1985 | Lopez et al. ............. 208/108 |
| 4,581,125 A | 4/1986 | Stiefel et al. ............ 208/108 |
| 4,596,785 A | 6/1986 | Toulhoat et al. ........... 502/220 |
| 4,626,339 A | 12/1986 | Chianelli et al. ........... 208/18 |
| 4,632,747 A | 12/1986 | Ho et al. ................. 208/18 |
| 4,650,563 A | 3/1987 | Jacobson et al. ........... 208/108 |
| 4,666,878 A | 5/1987 | Jacobson et al. ........... 502/219 |
| 4,668,376 A * | 5/1987 | Young et al. ............. 208/108 |
| 4,695,369 A | 9/1987 | Garg et al. .............. 208/112 |
| 4,698,145 A | 10/1987 | Ho et al. ................. 208/18 |
| 4,721,558 A | 1/1988 | Jacobson et al. ........... 208/108 |
| 4,724,068 A | 2/1988 | Stapp ..................... 208/213 |
| 4,748,142 A | 5/1988 | Chianelli et al. ........... 502/220 |
| 4,755,496 A | 7/1988 | Ho et al. ................. 502/165 |
| 4,792,541 A | 12/1988 | Ho et al. ................. 502/167 |
| 4,795,731 A | 1/1989 | Pecoraro et al. ........... 502/221 |
| 4,801,570 A | 1/1989 | Young et al. ............. 502/220 |
| 4,820,677 A | 4/1989 | Jacobson et al. ........... 502/220 |
| 4,824,820 A | 4/1989 | Jacobson et al. ........... 502/219 |
| 5,158,982 A | 10/1992 | Stapp ..................... 521/41 |
| 5,186,818 A | 2/1993 | Daage et al. ............ 208/254 H |
| 5,332,489 A | 7/1994 | Veluswamy ............... 208/56 |
| 5,382,349 A | 1/1995 | Yoshita et al. ............. 208/49 |
| 5,484,755 A | 1/1996 | Lopez ................... 502/219 |
| 5,872,073 A | 2/1999 | Hilsenbeck et al. ........ 502/220 |
| 6,248,687 B1 | 6/2001 | Itoh et al. ................ 502/216 |
| 6,623,623 B2 | 9/2003 | Kalnes ................... 208/89 |
| 7,214,309 B2 | 5/2007 | Chen et al. .............. 208/111.3 |
| 7,238,273 B2 | 7/2007 | Chen et al. ............... 208/49 |
| 7,396,799 B2 | 7/2008 | Chen et al. .............. 502/216 |
| 7,402,547 B2 | 7/2008 | Wellington et al. ......... 502/222 |
| 7,410,928 B2 | 8/2008 | Chen et al. .............. 502/216 |
| 7,416,653 B2 | 8/2008 | Wellington et al. ......... 208/108 |
| 7,431,822 B2 | 10/2008 | Farshid et al. ............. 208/57 |
| 7,431,824 B2 | 10/2008 | Chen et al. .............. 208/108 |
| 7,431,831 B2 | 10/2008 | Farshid et al. ............ 208/423 |
| 7,763,160 B2 | 7/2010 | Wellington et al. ......... 208/14 |
| 7,811,445 B2 | 10/2010 | Wellington et al. ......... 208/14 |
| 7,828,958 B2 | 11/2010 | Wellington et al. ......... 208/14 |
| 7,854,833 B2 | 12/2010 | Wellington et al. ........ 208/108 |
| 7,879,223 B2 | 2/2011 | Wellington et al. |
| 8,491,782 B2 * | 7/2013 | Reynolds et al. ........... 208/112 |
| 8,530,370 B2 * | 9/2013 | Donaho et al. ............ 502/215 |
| 2006/0058174 A1 | 3/2006 | Chen et al. ................. 502/3 |
| 2006/0157385 A1 | 7/2006 | Montanari et al. ........... 208/49 |
| 2007/0138055 A1 | 6/2007 | Farshid et al. ............. 208/49 |
| 2007/0138057 A1 | 6/2007 | Farshid et al. ............. 208/57 |
| 2007/0140927 A1 | 6/2007 | Reynolds ................. 422/140 |
| 2007/0238607 A1 | 10/2007 | Alonso et al. ............. 502/177 |
| 2008/0305947 A1 | 12/2008 | Chen et al. .............. 502/217 |

(Continued)

FOREIGN PATENT DOCUMENTS

| CA | 1248514 | 1/1989 | ............ B01J 21/18 |
| EP | 0133031 | 2/1985 | ............ C10G 45/08 |

(Continued)

OTHER PUBLICATIONS

The Copper-Molybdenum Antagonism in Ruminants. III. Reaction of Copper(II) with Tetrathiomolybdate (VI), S. Laurie, D. Pratt, and J.B. Raynor, *Inorganic Chimica Acta*, vol. 123, pp. 193-196 (1986).
Polymeric ternary metal thiols I. Products from reaction of Cu(II) with $MoS_4^{2-}$, T. Ecclestone, I. Harvey, S. Laurie, M. Symons, F. Taiwo, *Inorganic Chemical Communications*, vol. 1, pp. 460-462 (1998).
Thiomolybdates—Simple but Very Versatile Reagents, S. Laurie, *Eur. J. Inorg. Chem.*, pp. 2443-2450 (2000).
Hydrodenitrogenation-Selective Catalysts, T.C. Ho, A. Jacobson, R. Chianelli, C. Lund, *Journal of Catalysis*, vol. 138, pp. 351-363 (1992).
Synthesis of tetraalkylammonium thiometallate precursors and their concurrent in situ activation during hydrodesulfurization of dibenzothiophene, G. Alonzo et al., *Applied Catalysis A: General*, vol. 263, pp. 109-117 (2004).

(Continued)

*Primary Examiner* — Timothy Vanoy

(57) ABSTRACT

The present invention is directed to a manganese tetrathiotungstate composition.

14 Claims, No Drawings

(56) References Cited

U.S. PATENT DOCUMENTS

| | | | | |
|---|---|---|---|---|
| 2009/0057193 | A1 | 3/2009 | Farshid et al. | 208/56 |
| 2009/0057194 | A1 | 3/2009 | Farshid et al. | 208/56 |
| 2009/0057195 | A1 | 3/2009 | Powers et al. | 208/59 |
| 2011/0195014 | A1* | 8/2011 | Reynolds | 423/511 |
| 2011/0195015 | A1* | 8/2011 | Reynolds | 423/511 |

FOREIGN PATENT DOCUMENTS

| | | | | |
|---|---|---|---|---|
| EP | 0546686 | 6/1993 | | C10G 47/02 |
| FR | 2130297 | 3/1972 | | C10G 37/00 |
| GB | 630204 | 10/1949 | | |
| JP | H08199173 | 8/1996 | | C01G 47/02 |
| WO | WO2005082382 | 9/2005 | | A61K 33/00 |
| WO | WO2007059621 | 5/2007 | | B01J 23/883 |
| WO | WO2008014947 | 2/2008 | | C10G 67/04 |
| WO | WO2008141830 | 11/2008 | | C10G 49/04 |
| WO | WO2008141831 | 11/2008 | | C10G 49/00 |
| WO | WO2008151792 | 12/2008 | | C10G 1/06 |
| WO | WO2009003633 | 1/2009 | | C10G 21/00 |
| WO | WO2009003634 | 1/2009 | | C10G 21/00 |

OTHER PUBLICATIONS

Synthesis of tetraalkylammonium thiometallates in aqueous solution, G. Alonzo et al., Inorganica Chimica Acta, vol. 325, pp. 193-197 (2001).

Synthesis and Characterization of $Et_4N)_4[MoS_4Cu_{10}Cl_{12}]$: A Polynuclear Molybdenum-Copper Cluster Containing a Central Tetrahedral $MoS_4$ Encapsulated by Octahedral $Cu_6$ and Tetrahedral $Cu_4$ Arrays, Wu et al., Inorg. Chem., vol. 35, pp. 1080-1082 (1996).

Preparation and Characterization of Cu(II), Zn(II) Sulfides Obtained by Spontaneous Precipitation in Electrolyte Solutions, D. Tsamouras et al., Langmuir, vol. 14, pp. 5298-5304 (1998).

Physicochemical Characteristics of Mixed Copper-Cadmium Sulfides Prepared by Coprecipitation, D. Tsamouras et al., Langmuir, vol. 15, pp. 8018-8024 (1999).

Properties of Cu(II) and Ni(II) Sulfide Prepared by Coprecipitation in Aqueous Solution, D. Tsamouras et al., Langmuir, vol. 15, pp. 7940-7946 (1999).

The synthesis and characterization of $Cu_2MX_4$ (M=W or Mo; X=S, Se or S/Se) materials prepared by a solvothermal method, C. Crossland, P. Hickey, & J. Evans, Journal of Materials Chemistry, vol. 15, pp. 3452-3458 (2005).

Mo(W,V)—Cu(Ag)—S(Se) Cluster Compounds, H-W. Hou, X-Q Xin, S. Shi, Coordination Chemistry Reviews, 153, pp. 25-56 (1996).

Molecular Architecture of Copper (I) Thiometallate Complexes Example of a Cubane with an Extra Face, $(NPr_4)_3[MS_4Cu_4Cl_5]$ M=Mo, W), Y. Jeannin, F. Secheresse, S. Bernes, and F. Robert, Inorganica Chimica Acta, 198-200 pp. 493-505 (1992).

The Build-Up of Bimetallic Transition Metal Clusters, P. R. Raithby, Platinum Metals Review, 42(4) pp. 146-157 (1998).

New Aspects of Heterometallic Copper (Silver) Cluster Compounds Involving Sulfido Ligands, X. Wu, Q. Huang, Q. Wang. T. Sheng, and J. Lu, Chaper 17, Transition Metal Sulfur Chemistry, pp. 282-296, American Chemical Society (1996).

Properties of Biological Copper, Molybdenum, and Nickel Compounds, D. Pratt, Thesis, Leicester Polytechnic School of Chemistry (1985).

A combined in situ X-ray absorption spectroscopy and X-ray diffraction study of the thermal decomposition of ammonium tetrathiotungstate, R. Walton and S. Hibble, J. Mater. Chem., vol. 9, pp. 1347-1355 (1999).

Polymers of $[MS_4]^{2-}$ (M=Mo, W) With Cu(I) and Ag(I): Synthesis and Characterization of $[Me_4N][CuMS_4]$ and $[Me_4N][AgMS_4]$ and Their Polymeric Chain Breaking Reactions with M'CN (M'=Cu, Ag) to Form Cluster Complexes, A. B. M. Shamshur Rahman et al., Journal of Bangladesh Academy of Sciences, vol. 30, No. 2, pp. 203-212 (2006).

Synthesis and Characterization of Copper (I) Tetrathiomolybdates, V. Lakshmanan et al., Indian Journal of Chemistry, vol. 33A, pp. 772-774 (Aug. 1994).

Raman, Resonance Raman, and Infrared Spectroscopic Study of Complexes Containing Copper(I)-Tetrathio-Molybdate(VI) and—Tungstate(VI) Anions, Robin J. H. Clark et al., J. Chem. Soc. Dalton Trans., pp. 1595-1601 (1986).

Complexes of $d^8$ Metals with Tetrathiomolybdate and Tetrathiotungstate Ions, Synthesis, Spectroscopy, and Electrochemistry, K. P. Callahan and P. A. Piliero, Inorg. Chem., vol. 19, pp. 2619-2626 (1980).

Metal Sulfide Complexes and Clusters, D. Richard, G. Luther III, Reviews in Mineralogy & Geochemistry, vol. 61, pp. 421-504 (2006).

Properties of Some Solid Tetrathiomolybdates, G. M. Clark and W. P. Doyle, J. Inorg. Nucl. Chem., vol. 28, pp. 281-385 (1966).

On the Preparation, Properties, and Structure of Cuprous Ammonium Thiomolybdate, W.P. Binnie, M.J. Redman, and W.J. Mallio, Inorg. Chem., vol. 9, No. 6, pp. 1449-1452 (Jun. 1970).

Quasirelativistic Effects in the Electronic Structure of the Thiomolybdate and Thiotungstate Complexes of Nickel, Palladium, and Platinum, B.D. El-Issa and M.M. Zeedan, Inorg. Chem., vol. 30, pp. 2594-2605 (1991).

Spongy chalcogels of non-platinum metals act as effective hydrodesulfurization catalysts, Santanu Bag et al., Nature Chemistry, DOI:10.1039/NCHEM.208, pp. 1-8 (Published Online www.nature.com: May 17, 2009).

Research on Soluble Metal Sulfides: From Polysulfido Complexes to Functional Models for the Hydrogenases, Thomas B. Rauchfuss, Inorg. Chem., vol. 43, pp. 14-26 (2004).

* cited by examiner

MANGANESE TETRATHIOTUNGSTATE MATERIAL

CROSS REFERENCE TO RELATED APPLICATION

The present application claims the benefit of priority from U.S. Provisional Patent Application Ser. No. 61/297,073 filed Jan. 21, 2010.

FIELD OF THE INVENTION

The present invention is directed to a manganese tetrathiotungstate material.

BACKGROUND OF THE INVENTION

Increasingly, resources such as heavy crude oils, tar sands, shale oils, and coal are being utilized as hydrocarbon sources due to decreasing availability of easily accessed light sweet crude oil reservoirs. These resources are disadvantaged relative to light sweet crude oils, often containing significant amounts of sulfur, nitrogen, metals, and heavy hydrocarbon fractions including residue and asphaltenes. The disadvantaged crudes typically require a considerable amount of upgrading in order to obtain useful hydrocarbon products therefrom.

Numerous catalysts have been developed for catalytically hydrocracking and hydrotreating disadvantaged hydrocarbon feedstocks. Typically, these catalysts contain a Group VIB or Group VIII metal supported on a carrier formed of alumina, silica, or alumina-silica. Such catalysts are commonly sulfided to activate the catalyst, either before contacting the catalyst with a disadvantaged hydrocarbon feed or in situ with the disadvantaged hydrocarbon feed.

Applicants have discovered that bimetallic tetrathiometallate materials are exceptionally good catalysts for upgrading disadvantaged hydrocarbon feedstocks, particularly for converting all or substantially all heavy fractions such as residue and asphaltenes in the feedstock to lighter fractions while forming little or no coke. In particular, Applicants have discovered that bimetallic tetrathiomolybdate, bimetallic tetrathiotungstate, and bimetallic tetrathiovanadate materials are especially effective for hydrocracking disadvantaged hydrocarbon feedstocks to upgrade the feedstocks.

Ammonium and alkylammonium thiometallates have been used as precursors to produce metal sulfides. For example, tetralkylammonium thiomolybdate, tetralkylammonium thiotungstate, and ammonium thiomolybdate precursor compounds have been treated at temperatures of above 350° C. to thermally decompose the precursor compounds to produce $MoS_2$ and $WS_2$ disulfides having predicable stoichoimetry that have a high surface area and show substantial hydrodesulfurization and hydrodenitrogenation catalytic activity in a hydrocarbon feedstock. Ammonium thiometallates have also been used as precursors to produce bimetallic compounds in an organic solvent. For example, copper thiometallates and copper selenometallates have been produced using a solvothermal method by reacting $(NH_4)_2MoS_4$, $(NH_4)_2WS_4$, $(PPh_4)_2MoSe_4$, or $(PPh_4)_2WSe_4$ with copper borofluoride salts in organic solvents at temperatures of 110° C. or above in an autoclave at autogenous pressures. Iron-molybdenum sulfide compounds have been produced by dissolving $(NH_4)_2MoS_4$ in an organic chelating solution of diethylenetriamine (dien) and slowly adding an iron salt in a 10% aqueous dien solution to precipitate a hydrodenitrogenation catalyst precursor. The precursor is thermally decomposed to remove organic ligand constituents and sulfactivate the catalyst. Copper thiomolybdates containing oxygen have been produced from ammonium tetrathiomolybdates and a copper salt by mixing aqueous solutions of reactants $CuSO_4 5H_2O$ and $M_2^I$-$MoS_4$ ($M^I$=$NH_4^+$, $Et_4N^+$, or $Na^+$) and $(NH_4)_2MoS_4$ in the presence of oxygen. Manganese tetrathiotungstates are not known and no methods of producing a manganese tetrathiotungstate material are known.

A manganese tetrathiotungstate material and a method for making such a material are desirable to provide a material useful as a catalyst for hydrocracking and/or hydrotreating a crude oil or a crude oil fraction.

SUMMARY OF THE INVENTION

The present invention is directed to a composition comprising a material comprised of manganese tetrathiotungstate.

DETAILED DESCRIPTION OF THE INVENTION

The present invention is directed to a composition comprising a material comprised of manganese tetrathiotungstate. The manganese tetrathiotungstate material does not require sulfiding to serve as a catalyst for hydrotreating or hydrocracking a hydrocarbon feedstock such as a crude oil, a disadvantaged crude oil, or a crude oil fraction since the catalytically active metals are bonded to sulfur atoms. Further, the manganese tetrathiotungstate may contain little or no oxygen, enhancing the catalytic activity of the material as an electron donor. Further still, the manganese tetrathiotungstate material may have an acicular form that has a large proportion of surface area relative to the mass of the material—which renders the manganese tetrathiotungstate material highly active as a catalyst since catalytic activity of a catalyst occurs at the interface of the catalyst surface and the reactants that contact the catalyst. The surface area of the manganese tetrathiotungstate material of the present invention is accessible for catalyzing hydrocracking of large, high molecular weight hydrocarbons since the material is not deposited in pores of a support material that would inhibit contact of the large, high molecular weight hydrocarbons with the material.

As used herein, the phrase "anaerobic conditions" means "conditions in which less than 0.5 vol. % oxygen is present". For example, a process that occurs under anaerobic conditions, as used herein, is a process that occurs in the presence of less than 0.5 vol. % oxygen. Anaerobic conditions may be such that no detectable oxygen is present.

The term "aqueous" as used herein is defined as containing more than 50 vol. % water. For example, an aqueous solution or aqueous mixture, as used herein, contains more than 50 vol. % water.

"ASTM" as used herein refers to American Standard Testing and Materials. The term "dispersible" as used herein with respect to mixing a solid, such as a salt, in a liquid is defined to mean that the components that form the solid, upon being mixed with the liquid, are retained in the liquid for a period of at least 24 hours upon cessation of mixing the solid with the liquid. A solid material is dispersible in a liquid if the solid or its components are soluble in the liquid. A solid material is also dispersible in a liquid if the solid or its components form a colloidal dispersion or a suspension in the liquid.

The term "ligand" as used herein is defined as a molecule or ion attached to, or capable of attaching to, a metal ion in a coordination complex.

The term "monomer" as used herein is defined as a molecular compound that may be reactively joined with itself or another monomer in repeated linked units to form a polymer.

The term "polymer" as used herein is defined herein as a compound comprised of repetitively linked monomer units.

As used herein, an element of the Periodic Table of Elements may be referred to by its symbol in the Periodic Table. For example, Cu may be used to refer to copper, Au may be used to refer to gold, Hg may be used to refer to mercury etc.

The term "soluble" as used herein refers to a substance a majority (e.g. greater than 50 wt. %) of which dissolves in a liquid upon being mixed with the liquid at a specified temperature and pressure. For example, a material dispersed in a liquid is soluble in the liquid if less than 50 wt. % of the material may be recovered from the liquid by centrifugation and filtration.

The manganese tetrathiotungstate material of the present invention may be comprised of manganese and tungsten bridged by, and bonded to, sulfur atoms according to formula (I)

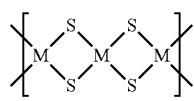
(I)

where M is either manganese or tungsten and at least one M is manganese and at least one M is tungsten.

In another embodiment of the invention, the manganese tetrathiotungstate material of the present invention is comprised of at least three linked chain elements, the chain elements being comprised of a first chain element including tungsten and having a structure according to formula (II) and a second chain element including manganese and having a structure according to formula (III)

(II)

(III)

where $M^1$ is manganese and $M^2$ is tungsten. The manganese tetrathiotungstate material contains at least one first chain element and at least one second chain element where at least a portion of the chain elements in the manganese tetrathiotungstate material are linked by bonds between the two sulfur atoms of a chain element and the metal of an adjacent chain element.

In another embodiment of the present invention, the manganese tetrathiotungstate material of the present invention is comprised of monomeric units that repeat in the material to form a polymer, where a monomeric unit is comprised of tungsten and manganese, where the tungsten and the manganese are bridged by, and bonded to, two sulfur atoms according to formula (IV)

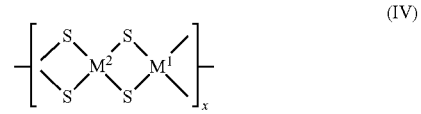
(IV)

where $M^1$ is manganese, $M^2$ is tungsten, and x is at least 2. Preferably the manganese tetrathiotungstate material contains at least 5, or at least 10, or at least 20, or at least 50, or at least 100 linked monomer units according to formula (IV) (where x is at least 5, at least 10, at least 20, or at least 50, or at least 100).

Furthermore, the manganese tetrathiotungstate material may have a two-dimensional or a three-dimensional polymeric structure with alternating metal centers comprised of tungsten and manganese bridged by two sulfur atoms. The two- and/or three-dimensional polymeric structure of the manganese tetrathiotungstate material may have "holes" in its structure, in which one or more of the atoms of manganese are missing as an alternating metal atom in the polymeric structure. The two- and/or three-dimensional polymeric structure may contain a portion of the manganese within interstices in the polymeric structure or in holes in the polymeric structure, where the portion of the manganese located in the interstices or holes in the polymeric structure is not bonded with tungsten or with a sulfur in the polymeric structure.

In another embodiment of the invention, the manganese tetrathiotungstate material may be comprised of alternating atoms of manganese and tungsten bonded to and linked by two sulfur atoms in alternating $MnS_4$ and $WS_4$ tetrahedral formations located adjacent to each other, where the metal of each tetrahedral formation is bonded to at least two sulfur atoms that are also bonded to the metal of an adjacent tetrahedral formation (i.e. each tetrahedral formation shares at least two sulfur atoms with an adjacent tetrahedral formation). The adjacent tetrahedral formations of $MnS_4$ and $WS_4$ may be tetrahedral edge-sharing formations.

The manganese tetrathiotungstate material is typically at least partially crystalline, where the cystallinity of the material may be determined by x-ray powder diffraction. The manganese tetrathiotungstate material may be from 30 to 100% crystalline, or from 40% to 99% crystalline, of from 50% to 95% crystalline, or at least 30% crystalline, or at least 40% crystalline, or at least 50% crystalline, or at least 60% crystalline The manganese tetrathiotungstate material may have a tetrahedral crystalline structure.

The manganese tetrathiotungstate material may be in an acicular form. The acicular manganese tetrathiotungstate may be comprised of a plurality of hair or fiber-like manganese tetrathiotungstate strands. The manganese tetrathiotungstate strands may have a length of at least 100 nm, or at least 250 nm, or at least 500 nm, or at least 750 nm, and may have a width of at most 30 nm, or at most 25 nm, or at most 20 nm, or at most 10 nm, or at most 5 nm.

The acicular manganese tetrathiotungstate material comprised of a plurality of hair or fiber-like strands may have a relatively large surface area, particularly relative to the mass of the material. A relatively large surface area is desirable to provide high catalytic activity when the manganese tetrathiotungstate material is used as a catalyst in hydrocracking and/or hydrotreating a hydrocarbon feedstock. Particles of the manganese tetrathiotungstate material may have a BET surface area of from 50 $m^2/g$ to 500 $m^2/g$, or from 100 $m^2/g$ to 350 $m^2/g$.

The manganese tetrathiotungstate material typically comprises at most 0.1 wt. %, or at most 0.05 wt. %, or at most 0.01 wt. % oxygen. Oxygen content of the manganese tetrathiotungstate material may be measured by neutron activation, for example, as determined in accordance with ASTM Method E385. In a preferred embodiment, oxygen is not detectable in the manganese tetrathiotungstate material. Oxygen is undesirable in the material when the material is to be used as a catalyst for hydrocracking a disadvantaged crude oil. The catalytic activity of the manganese tetrathiotungstate material as a hydrocracking catalyst is, in part, believed to be due to the availability of electrons from the material to stabilize cracked molecules in the crude oil. Due to its electronegativity, oxygen tends to reduce the availability of electrons from the manganese tetrathiotungstate material when it is present in the material in appreciable quantities.

The manganese tetrathiotungstate material may contain at most 0.5 wt. %, or at most 0.1 wt. %, or at most 0.01 wt. % of an alkali metal or an alkaline earth metal. The alkali metal or alkaline earth metal content in the manganese tetrathiotungstate material may be measured by x-ray fluorescence. Alkali metals and/or alkaline earth metals may be an undesirable contaminants in the manganese tetrathiotungstate material.

The manganese tetrathiotungstate material may contain less than 0.5 wt. % of ligands other than the sulfur-metal bonded complexes between sulfur and manganese and between sulfur and tungsten. Ligands, other than the sulfur-metal bonded complexes with manganese and tungsten metals, are not desirable in the manganese tungsten material since they may end-cap the material in the course of formation of the material, inhibiting formation of a polymeric manganese tetrathiotungsten.

In order to form the manganese tetrathiotungstate material, a first salt and a second salt are mixed in an aqueous mixture under anaerobic conditions at a temperature of from 15° C. to 150° C., and the manganese tetrathiotungstate material is separated from the aqueous mixture. The first salt utilized to produce the manganese tetrathiotungstate material includes an anionic component that is a tetrathiotungstate. In particular, the first salt contains the anionic component $WS_4^{2-}$.

The first salt also contains a cationic component associated with the anionic component of the first salt to form the first salt. The cationic component of the first salt may be selected from ammonium, alkyl ammonium, alkali metal and alkaline earth metal counterions to the tetrathiotungstate anionic component of the first salt so long as the combined cationic component and the anionic component of the first salt form a salt that is dispersible, and preferably soluble, in the aqueous mixture in which the first salt and the second salt are mixed at the temperature at which the first and second salts are mixed, and so long as the cationic component of the first salt does not prevent the combination of the anionic component of the first salt with the cationic component of the second salt in the aqueous mixture to form the manganese tetrathiotungstate material. Preferably, the cationic component balances the charge of the anionic component in the first salt, and, preferably, the cationic component of the first salt comprises one or more sodium ions, one or more potassium ions, or one or more ammonium ions.

Certain compounds are preferred for use as the first salt used to form the manganese tetrathiotungstate material of the present invention. In particular, the first salt is preferably selected from the group consisting of, $Na_2WS_4$, $K_2WS_4$, and $(NH_4)_2WS_4$.

The first salt may be a commercially available tetrathiotungstate salt. For example, the first salt may be ammonium tetrathiotungstate, which is commercially available from Sigma-Aldrich, 3050 Spruce St., St. Louis, Mo., USA 63103. The first salt, if not commercially available, may be produced from a commercially available tetrathiotungstate. The first salt may be formed from a commercially available ammonium tetrathiotungstate salt by exchanging the cationic ammonium component of the commercially available salt with a desired alkali or alkaline earth cationic component from a separate salt. The exchange of the cationic components to form the desired first salt may be effected by mixing the commercially available salt and the salt containing the desired cationic component in an aqueous solution to form the desired first salt.

A preferred method of forming the first salt is to dissolve an ammonium tetrathiotungstate in an aqueous solution, preferably water, and to dissolve an alkali metal or alkaline earth metal cationic component donor salt, preferably a carbonate, in the aqueous solution, where the cationic component donor salt is provided in an amount relative to the ammonium tetrathiotungstate salt to provide a stoichiometrially equivalent or greater amount of its cation to ammonium of the ammonium tetrathiotungstate salt. The aqueous solution may be heated to a temperature of at least 50° C., or at least 65° C. up to 100° C. to evolve ammonia from the ammonium containing salt and carbon dioxide from the carbonate containing salt as gases, and to form the first salt. For example a $Na_2WS_4$ salt may be prepared for use as the first salt by mixing commercially available $(NH_4)_2WS_4$ and $Na_2CO_3$ in water at a temperature of 70° C.-80° C. for a time period sufficient to permit evolution of a significant amount, preferably substantially all, of ammonia and carbon dioxide gases from the solution, typically from 30 minutes to 4 hours, and usually about 2 hours.

The first salt may be contained in an aqueous solution or mixture, where the aqueous solution or mixture containing the first salt (hereinafter the "first aqueous solution") may be mixed with the second salt or an aqueous solution or mixture containing the second salt (hereinafter the "second aqueous solution") in the aqueous mixture to form the manganese tetrathiotungstate material. The first salt is preferably dispersible, and most preferably soluble, in the first aqueous solution and is dispersible, and preferably soluble, in the aqueous mixture of the first and second salts at the temperature at which the first and second salts are mixed in the aqueous mixture. The first aqueous solution contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons selected from the group consisting of an alcohol, a diol, an aldehyde, a ketone, an amine, an amide, a furan, an ether, acetonitrile, and mixtures thereof. The organic solvent present in the first aqueous solution, if any, should be selected so that the organic compounds in the organic solvent do not inhibit reaction of the anionic tetrathiotungstate component of the first salt with the cationic manganese component of the second salt upon forming an aqueous mixture containing the first aqueous solution, e.g., by forming ligands or by reacting with the first or second salts or their respective cationic or anionic components. Preferably, the first aqueous solution contains no organic solvent. Most preferably the first aqueous solution consists essentially of water, most preferably deionized water, and the first salt, although the first aqueous solution may contain compounds other than the first salt, such as a buffer compound.

If the first salt is contained in a first aqueous solution, the concentration of the first salt in the first aqueous solution may be selected to promote formation of a manganese tetrathiotungstate material having a particle size distribution with a small mean and/or median particle size and having a relatively large surface area per particle upon mixing the first salt and the second salt in the aqueous mixture. It has been found that decreasing the instantaneous concentration of the first salt and/or the second salt during mixing in the aqueous mixture produces a manganese tetrathiotungstate material comprised of smaller particles relative to such materials produced from an aqueous mixture containing higher instantaneous concentrations of the first and second salts, where the small particles have a relatively large surface area. Preferably, the first aqueous solution may be prepared to contain at most 0.8 moles per liter, or at most 0.6 moles per liter, or at most 0.4 moles per liter, or at most 0.2 moles per liter, or at most 0.1 moles per liter of the first salt.

The second salt utilized to produce the manganese tetrathiotungstate includes a manganese cationic component in any non-zero oxidation state. The manganese cationic component of the second salt must be capable of bonding with the anionic tetrathiotungstate component of the first salt to form the manganese tetrathiotungstate material in the aqueous mixture at a temperature of from 15° C. to 150° C. and under anaerobic conditions.

The second salt also contains an anionic component associated with the manganese cationic component of the second salt to form the second salt. The anionic component of the second salt may be selected from a wide range of counterions to the manganese cationic component of the second salt so long as the combined manganese cationic component and the anionic component of the second salt form a salt that is dispersible, and preferably soluble, in the aqueous mixture in which the first salt and the second salt are mixed at the temperature at which they are mixed, and so long as the anionic component of the second salt does not prevent the combination of the anionic tetrathiotungstate component of the first salt with the manganese cationic component of the second salt in the aqueous mixture to form the manganese tetrathiotungstate material. Preferably, the anionic component of the second salt balances the charge of the manganese cationic component of the second salt in the second salt. The anionic component of the second salt may be selected from the group consisting of sulfate, chloride, bromide, iodide, acetate, acetylacetonate, oxalate, citrate, tartrate, and mixtures thereof.

Certain compounds are preferred for use as the second salt to produce the manganese tetrathiotungstate material of the present invention. In particular, the second salt is preferably selected from the group consisting of MnSO4, $MnCl_2$, manganese acetate, manganese acetylacetonate, and hydrates and mixtures thereof. These materials are generally commercially available, or may be prepared from commercially available materials according to well-known methods.

The second salt may be contained in an aqueous solution (the second aqueous solution, as noted above), where the second aqueous solution containing the second salt may be mixed with the first salt or a first aqueous solution containing the first salt in the aqueous mixture to form the manganese tetrathiotungstate material of the present invention. The second salt is preferably dispersible, and most preferably soluble, in the second aqueous solution and is dispersible, and preferably soluble, in the aqueous mixture containing the first and second salts at the temperature at which the first and second salts are mixed. The second aqueous solution contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the second aqueous solution, if any, should be selected so that the organic compounds in the organic solvent do not inhibit reaction of the anionic tetrathiotungstate component of the first salt with the manganese cationic component of the second salt upon forming an aqueous mixture containing the second aqueous solution, e.g., by forming ligands or by reacting with the first or second salts or their respective cationic or anionic components. Preferably, the second aqueous solution contains no organic solvent. Most preferably the second aqueous solution consists essentially of water, preferably deionized, and the second salt, although the second aqueous solution may contain compounds other than the second salt, such as a buffer.

If the second salt is contained in a second aqueous solution, the concentration of the second salt in the second aqueous solution may be selected to promote formation of the manganese tetrathiotungstate material having a particle size distribution with a small mean and/or median particle size, where the particles have a relatively large surface area, upon mixing the first salt and the second salt in the aqueous mixture. As noted above, it has been found that decreasing the instantaneous concentration of the first salt and/or the second salt during mixing in the aqueous mixture produces a manganese tetrathiotungstate material comprised of smaller particles relative to such materials produced from an aqueous mixture containing higher instantaneous concentrations of the first and second salts, where the small particles have a relatively large surface area. Preferably, the second aqueous solution may contain at most 3 moles per liter, or at most 2 moles per liter, or at most 1 mole per liter, or at most 0.6 moles per liter, or at most 0.2 moles per liter of the second salt.

The first salt and the second salt are mixed in an aqueous mixture to form the manganese tetrathiotungstate material. The amount of the first salt relative to the amount of the second salt provided to the aqueous mixture may be selected so that the atomic ratio of the manganese of the second salt to the tungsten of the first salt is from 2:3 to 20:1, or from 1:1 to 10:1. The amount of the first salt and the second salt provided to the aqueous mixture may be selected so that the atomic ratio of the manganese of the second salt to the tungsten of the first salt is at least 1.5:1, or at least 1.6:1, or at least 2:1, or more than 2:1 since selection of a ratio of less than 1.5:1 may lead to incorporation of a small quantity of the cationic component of the first salt in the manganese tetrathiotungstate product.

In one method of producing the manganese tetrathiotungstate material, an aqueous mixture of the first salt and the second salt may be formed by adding a solid form of the second salt to an aqueous solution containing the first salt (the first aqueous solution). Alternatively, the aqueous mixture of the first salt and the second salt may be formed by adding a solid form of the first salt to an aqueous solution containing the second salt (the second aqueous solution). The aqueous mixture of the first and second salts may also be formed by combining a first aqueous solution containing the first salt and a second aqueous solution containing the second salt. If desired, water—preferably deionized—may be added to the aqueous mixture formed by any of these methods to dilute the aqueous mixture and reduce the concentrations of the first and second salts in the aqueous mixture.

Preferably, the aqueous mixture of the first and second salts may be formed by adding the first salt and the second salt into an aqueous solution separate from both a first aqueous solution containing the first salt and a second aqueous solution containing the second salt. The separate aqueous solution will be referred to hereafter as the "third aqueous solution". The third aqueous solution contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the third aqueous solution, if any, should be selected so that the organic compounds in the organic solvent do not inhibit reaction of the anionic tetrathiotungstate component of the first salt with the manganese cationic component of the second salt upon forming the aqueous mixture, e.g., by forming ligands or reacting with the anionic tetrathiotungstate component of the first salt or with the manganese cationic component of the second salt. Preferably, the third aqueous solution contains no organic solvent, and most preferably comprises deionized water.

The first salt and the second salt may be added as solids to the third aqueous solution. Alternatively, either the first salt in a first aqueous solution or the second salt in a second aqueous solution may be added to the third aqueous solution while adding the other salt in solid form to form the aqueous mixture. If desired, water may be added to the aqueous mixture formed by any of these methods to dilute the aqueous mixture and reduce the concentrations of the first and second salts in the aqueous mixture.

Most preferably, the aqueous mixture of the first and second salts may be formed by combining a first aqueous solution containing the first salt and a second aqueous solution containing the second salt in a third aqueous solution. The volume ratio of the third aqueous solution to the first aqueous solution containing the first salt may be from 0.5:1 to 50:1 where the first aqueous solution preferably contains at most 0.8, or at most 0.4, or at most 0.2, or at most 0.1 moles of the first salt per liter of the first aqueous solution. Likewise, the volume ratio of the third aqueous solution to the second aqueous solution containing the second salt may be from 0.5:1 to 50:1 where the second aqueous solution preferably contains at most 3, or at most 2, or at most 1, or at most 0.8, or at most 0.5, or at most 0.3 moles of the second salt per liter of the second aqueous solution.

The first salt and the second salt may be combined in the aqueous mixture, regardless of which method is selected to combine the first and second salts, so that the aqueous mixture containing the first and second salts contains at most 1.5, or at most 1.2, or at most 1, or at most 0.8, or at most 0.6 moles of the combined first and second salts per liter of the aqueous mixture. It has been found that particle size of the manganese tetrathiotungstate material produced by mixing the first and second salts in the aqueous mixture increases and the surface area of the particles decreases with increasing concentrations of the salts. Therefore, to limit the particle sizes in the particle size distribution of the manganese tetrathiotungstate material and to increase the relative surface area of the particles, the aqueous mixture may contain at most 0.8 moles of the combined first and second salts per liter of the aqueous mixture, more preferably at most 0.6 moles, or at most 0.4 moles, or at most 0.2 moles of the combined first and second salts per liter of the aqueous mixture. The amount of first salt and the total volume of the aqueous mixture may be selected to provide at most 0.4, or at most 0.2, or at most 0.1, or at most 0.01 moles of the anionic component per liter of the aqueous mixture, and the amount of the second salt and the total volume of the aqueous mixture may be selected to provide at most 1, or at most 0.8, or at most 0.4 moles of the cationic component per liter of the aqueous mixture.

The rate of addition of the first salt and/or the second salt to the aqueous mixture may be controlled to limit the instantaneous concentration of the first salt and/or the second salt in the aqueous mixture to produce a manganese tetrathiotungstate material comprised of relatively small particles having relatively large surface area. Limiting the instantaneous concentration of one or both salts in the aqueous mixture may reduce the mean and/or median particle size of the resulting manganese tetrathiotungstate material by limiting the simultaneous availability of large quantities of the anionic tetrathiotungstate components of the first salt and large quantities of the manganese cationic components of the second salt that may interact to form a product material comprised primarily of relatively large particles. The rate of addition of the first salt and/or the second salt to the aqueous mixture may be controlled to limit the instantaneous concentration of the first salt and/or the second salt in the aqueous mixture to at most 0.05 moles per liter, or at most 0.01 moles per liter, or at most 0.001 moles per liter.

The rate of addition of the first salt and/or the second salt to the aqueous mixture may be controlled by limiting the rate of addition of a first aqueous solution containing the first salt and/or the rate of addition of a second aqueous solution containing the second salt to the aqueous mixture. The first aqueous solution containing the first salt may be added to the second aqueous solution containing the second salt, or the second aqueous solution may be added to the first aqueous solution, where the solution being added is added in a dropwise manner to the other solution. The rate of addition of drops of the first aqueous solution to the second aqueous solution or of drops of the second aqueous solution to the first aqueous solution may be controlled to provide the desired instantaneous concentration of the first salt or of the second salt in the aqueous mixture. Alternatively, the first aqueous solution containing the first salt may be dispersed directly into the second aqueous solution containing the second salt at a controlled flow rate to provide a desired instantaneous concentration of the first salt in the aqueous mixture. Or, the second aqueous solution containing the second salt may be dispersed directly into the first aqueous solution containing the first salt at a controlled flow rate selected to provide a desired instantaneous concentration of the second salt in the aqueous mixture. The first aqueous solution may be directly dispersed into the second aqueous solution or the second aqueous solution may be directly dispersed into the first aqueous solution at a selected controlled flow rate using conventional means for dispersing one solution into another solution at a controlled flow rate. For example, one solution may dispersed through a nozzle located in the other solution, where the flow of the solution through the nozzle may be metered by a flow rate control device.

Preferably, the first aqueous solution containing the first salt and the second aqueous solution containing the second salt are added to a third aqueous solution, preferably simultaneously, at a controlled rate selected to provide a desired instantaneous concentration of the first salt and the second salt in the aqueous mixture. The first aqueous solution containing the first salt and the second aqueous solution containing the second salt may be added to the third aqueous solution at a controlled rate by adding the first aqueous solution and the second aqueous solution to the third aqueous solution in a dropwise manner The rate that drops of the first aqueous solution and the second aqueous solution are added to the third aqueous solution may be controlled to limit the instantaneous concentration of the first salt and the second salt in the aqueous mixture as desired. Alternatively, the first aqueous solution containing the first salt and the second aqueous solution containing the second salt are dispersed directly into the third aqueous solution at a flow rate selected to provide a desired instantaneous concentration of the first salt and the second salt. The first aqueous solution and the second aqueous solution may be dispersed directly into the third aqueous solution using conventional means for dispersing one solution into another solution at a controlled flow rate. For example, the first aqueous solution and the second aqueous solution may be dispersed into the third aqueous solution through separate nozzles located within the third aqueous solution, where the flow of the first and second solutions through the nozzles is metered by separate flow metering devices.

The particle size distribution of the manganese tetrathiotungstate material produced by mixing the first salt and the second salt in the aqueous mixture is controlled by the rate of addition of the first salt and/or the second salt to the aqueous mixture, as described above, so that the median and/or mean particle size of the particle size distribution of the material falls within a range of from 50 nm to 5 μm. In a preferred embodiment, the particle size distribution of the solid material is controlled by the rate of addition of the first and/or second salts to the aqueous mixture so that the median and/or mean particle size of the particle size distribution of the material may range from at least 50 nm or at least 75 nm, or at least 100 nm up to 1 μm, or up to 750 nm, or up to 500 nm.

The surface area of the manganese tetrathiotungstate material particles produced by mixing the first salt and the second salt in the aqueous mixture is also preferably controlled by the rate of addition of the first salt and/or the second salt to the aqueous mixture, as described above, so that the BET surface area of the solid material particles is from 50 $m^2/g$ to 500 $m^2/g$. In an embodiment, the surface area of the solid material particles is controlled by the rate of addition of the first salt and/or the second salt to the aqueous mixture so that the BET surface area of the solid material particles is from 100 $m^2/g$ to 350 $m^2/g$ The aqueous mixture of the first and second salts contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the aqueous mixture, if any, should not inhibit reaction of the anionic tetrathiotungstate component of the first salt with the manganese cationic component of the second salt. Preferably, the aqueous mixture contains no organic solvent.

The aqueous mixture containing the first salt and the second salt is mixed to facilitate interaction and reaction of the anionic tetrathiotungstate component of the first salt with the manganese cationic component of the second salt to form the manganese tetrathiotungstate material. The aqueous mixture may be mixed by any conventional means for agitating a solution, for example by mechanical stirring.

During mixing, the temperature of the aqueous mixture is maintained in the range of from 15° C. to 150° C., or from 60° C. to 125° C., or most preferably from 65° C. to 100° C. Preferably, the temperature of the aqueous mixture during mixing is maintained at less than 100° C. so that the mixing may be conducted without the application of positive pressure necessary to inhibit the water in the aqueous mixture from becoming steam.

Maintaining the temperature of the aqueous mixture in a range of from 50° C. to 150° C. may result in production of a solid manganese tetrathiotungstate material having a relatively large surface area and a substantially reduced median or mean particle size relative to a solid material produced in the same manner at a lower temperature. It is believed that maintaining the temperature in the range of 50° C. to 150° C. drives the reaction of the manganese cationic component of the second salt with the anionic tetrathiotungstate component of the first salt, reducing the reaction time and limiting the time available for the resulting product to agglomerate prior to precipitation. Maintaining the temperature in a range of from 50° C. to 150° C. during the mixing of the first and second salts in the aqueous mixture may assist, in combination with the controlling the concentration of the first and second salts in the aqueous mixture, in production of a solid manganese tetrathiotungstate material having a particle size distribution with a median or mean particle size of from 50 nm to 5 μm, or up to 1 μm, or up to 1 μm; or up to 750 nm, and having a BET surface area of from 50 $m^2/g$ up to 500 $m^2/g$ or from 100 $m^2/g$ to 350 $m^2/g$.

The aqueous mixture may be heated using any conventional means for heating a solution being mixed. For example, the aqueous mixture may be mixed in a jacketed mixing apparatus, where heat may be applied to the aqueous mixture by passing steam through the jacket of the mixing apparatus. If utilized, the first aqueous solution, second aqueous solution, and/or the third aqueous solution may be heated to a temperature within the desired range prior to forming the aqueous mixture by mixing the first and second salts.

The first and second salts in the aqueous mixture may be mixed under a pressure of from 0.101 MPa to 10 MPa (1.01 bar to 100 bar). Preferably, the first and second salts in the aqueous mixture are mixed at atmospheric pressure, however, if the mixing is effected at a temperature greater than 100° C. the mixing may be conducted under positive pressure to inhibit the formation of steam.

During mixing, the aqueous mixture is maintained under anaerobic conditions. Maintaining the aqueous mixture under anaerobic conditions during mixing inhibits the oxidation of the resulting manganese tetrathiotungstate material or the anionic tetrathiotungstate component of the first salt so that the manganese tetrathiotungstate material produced contains little, if any oxygen. The aqueous mixture may be maintained under anaerobic conditions during mixing by conducting the mixing in an atmosphere containing little or no oxygen, preferably an inert atmosphere. The mixing of the first and second salts in the aqueous mixture may be conducted under nitrogen, argon and/or steam to maintain anaerobic conditions during the mixing. Preferably, an inert gas, most preferably nitrogen or steam, is continuously injected into the aqueous mixture during mixing to maintain anaerobic conditions and to facilitate mixing of the first and second salts in the aqueous mixture and displacement of ammonia gas if the second salt contains an ammonium cation.

The first and second salts are mixed in the aqueous mixture at a temperature of from 15° C. to 150° C. under anaerobic conditions for a period of time sufficient to permit the formation of the manganese tetrathiotungstate material. The first and second salt may be mixed in the aqueous mixture under these conditions for a period of at least 1 hour, or at least 2 hours, or at least 3 hours, or at least 4 hours, or from 1 hour to 10 hours, or from 2 hours to 9 hours, or from 3 hours to 8 hours, or from 4 hours to 7 hours to permit the formation of the manganese tetrathiotungstate material. The first and/or second salt(s) may be added to the aqueous mixture over a period of from 30 minutes to 4 hours while mixing the aqueous mixture, and after the entirety of the first and second salts have been mixed into the aqueous mixture, the aqueous mixture may be mixed for at least an additional 1 hour, or 2 hours, or 3 hours or 4 hours, or 5 hours to permit the formation of the manganese tetrathiotungstate material product.

After completing mixing of the aqueous mixture of the first and second salts, a solid is separated from the aqueous mixture to produce the solid manganese tetrathiotungstate material. The solid may be separated from the aqueous mixture by any conventional means for separating a solid phase material from a liquid phase material. For example, the solid may be separated by allowing the solid to settle from the resulting mixture, preferably for a period of from 1 hour to 16 hours, and separating the solid from the mixture by vacuum or gravitational filtration or by centrifugation. To enhance recovery of the solid, water may be added to the aqueous mixture prior to allowing the solid to settle. In an embodiment, water may be added to the aqueous mixture in a volume relative to the volume of the aqueous mixture of from 0.1:1 to 0.75:1. Alternatively, but less preferably, the solid may be separated from the mixture by centrifugation without first allowing the solid to settle and/or without the addition of water.

The separated solid particulate manganese tetrathiotungstate product may be washed subsequent to separating the solid from the aqueous mixture, if desired. The separated solid particulate manganese tetrathiotungstate material may be contaminated with minor amounts, typically less than 0.5 wt. %, of the cationic component from the first salt and/or the anionic component from the second salt. These minor contaminants may be removed from the separated solid material by washing the separated solid material with water. Substantial volumes of water may be used to wash the separated solid material since the separated solid particulate manganese tetrathiotungstate material is insoluble in water, and the yield of the product will not be significantly affected by the wash.

The optionally washed, separated, solid particulate manganese tetrathiotungstate material product may be dried, if desired. The product may be dried by heating the material and/or by holding the material under vacuum The material may be dried by heating to a temperature of from 35° C. to 75° C. under anaerobic conditions for a period of time sufficient to dry the material, typically from 12 hours to 5 days. The material may be dried by vacuum by holding the material under a vacuum for a period of from 12 hours to 5 days. Preferably the solid particulate manganese tetrathiotungstate material is dried by heating to a temperature of from 35° C. to 75° C. under vacuum for a period of 2 to 4 days.

The manganese tetrathiotungstate material may be produced from the first and second salts in relatively good yield. The manganese tetrathiotungstate material may be produced at a yield of at least 45% up to 95%, or up to 90%, or up to 85% from the first and second salts.

To facilitate a better understanding of the present invention, the following examples of certain aspects of some embodiments are given. In no way should the following examples be read to limit, or define, the scope of the invention.

EXAMPLE 1

A manganese tetrathiomolybdate material in accordance with the present invention was prepared. 10.04 grams of $(NH_4)_2MoS_4$ were mixed under nitrogen in 150 milliliters of deionized water at 80° C. to form a $(NH_4)_2MoS_4$ solution. Separately, 4.99 grams of manganese (II) acetate was mixed in 40 milliliters of deionized water. The manganese (II) acetate solution was added to the $(NH_4)_2MoS_4$ solution at ambient temperature under nitrogen, and the resulting mixture was stirred for 3 days at ambient temperature under argon. A yellow precipitate formed after the first day of stirring. A solid material was separated from the resulting slurry by centrifuge. The solid material was collected washed with deionized water and then dried by evaporation in a glove box in the absence of air or oxygen. The washed solids were then dried under vacuum at 55° C. 66.12 grams of solid product were recovered.

Semi-Quantitative XRF of the solid product measured, on a mass basis: 15.6% Mn; and 56.0% W. The product was not analyzed for sulfur. Analysis of the solid material showed that the solid material had the form of manganese tetrathiotungstate.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Also, the terms in the claims have their plain, ordinary meaning unless otherwise explicitly and clearly defined. Moreover, the indefinite articles "a" or "an", as used in the claims, are defined herein to mean one or more than one of the element that it introduces.

We claim:

1. A composition comprising a material comprised of manganese tetrathiotungstate.

2. The composition of claim 1 in which manganese and tungsten of the manganese tetrathiotungstate material are bridged by, and bonded to, sulfur atoms according to formula (I)

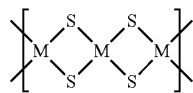

(I)

where M is either manganese or tungsten and at least one M is manganese and at least one M is tungsten.

3. The composition of claim 1 in which the manganese tetrathiotungstate material is comprised of at least three linked chain elements, the chain elements being comprised of a first chain element including manganese and having a structure according to formula (II) and a second chain element including tungsten and having a structure according to formula (III)manganese and tungsten of the manganese tetrathiotungstate material are bridged by, and bonded to, sulfur atoms according to the formula (II)

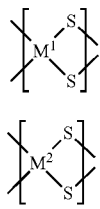

(II)

(III)

where $M^1$ is manganese and $M^2$ is tungsten, and the manganese tetrathiotungstate material contains at least one first chain element and at least one second chain element where at least a portion of the chain elements in the manganese tetrathiotungstate material are linked by bonds between the two sulfur atoms of a chain element and the metal of an adjacent chain element.

4. The composition of claim 1 wherein the manganese tetrathiotungstate material of the present invention is comprised of monomeric units that repeat in the material to form a polymer, where a monomeric unit is comprised of tungsten and manganese, where the tungsten and the manganese are bridged by, and bonded to, two sulfur atoms according to formula (IV)

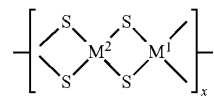

(IV)

where $M^1$ is the manganese, $M^2$ is tungsten, and x is at least 2.

5. The composition of claim 4 wherein x is at least 5.

6. The composition of claim 1 wherein the manganese tetrathiotungstate material is in the form of a plurality of fibers.

7. The composition of claim 6 wherein at least of portion of the fibers of the plurality of fibers have a width of up to 20 nm and a length of at least 100 nm.

8. The composition of claim 1 wherein the manganese tetrathiotungstate material has a BET surface area of from 50 $m^2/g$ to 500 $m^2/g$.

9. The composition of claim 1 in which the manganese tetrathiotungstate material contains at most 0.01 wt. % oxygen.

10. The composition of claim 1 in which the manganese tetrathiotungstate material contains less than 0.5 wt. % of an alkali metal or an alkaline earth metal.

11. The composition of claim 1 wherein the manganese tetrathiotungstate material is at least 50% crystalline.

12. The composition of claim 1 containing contains less than 0.5 wt. % of ligands other than sulfur-metal bonded complexes between sulfur and manganese and between sulfur and tungsten.

13. The composition of claim 1 in which the manganese tetrathiotungstate material is comprised of alternating $MnS_4$ and $WS_4$ tetrahedral formations located adjacent to each other, where the metal of each tetrahedral formation is bonded to at least two sulfur atoms that are also bonded to the metal of an adjacent tetrahedral formation.

14. The composition of claim 1 wherein the manganese tetrathiotungstate material is acicular.

* * * * *